United States Patent [19]

Resch

[11] 4,397,902
[45] Aug. 9, 1983

[54] CONSTRUCTION-ELEMENT

[75] Inventor: Ronald D. Resch, 43 Commercial Wharf, Apt. 5, Boston, Mass.

[73] Assignee: Ronald D. Resch, Boston, Mass.

[21] Appl. No.: 973,707

[22] Filed: Mar. 21, 1979

[30] Foreign Application Priority Data

Dec. 27, 1977 [NL] Netherlands ................. 7714437

[51] Int. Cl.³ ................... B32B 3/00; B32B 3/30
[52] U.S. Cl. ................. 428/119; 52/630;
52/635; 428/179; 428/180
[58] Field of Search ............ 428/72, 73, 119, 179, 428/180, 183, 116, 186, 174; 165/66; 52/785, 795, 799, 800, 813, 816, 630, 635; 217/26.5, 28, 27

[56] References Cited

U.S. PATENT DOCUMENTS

| 847,854 | 3/1907 | Voorhorst | 217/26.5 |
|---|---|---|---|
| 1,000,694 | 8/1911 | Schaeffer et al. | 217/26.5 |
| 1,154,254 | 9/1915 | Lachman | 428/178 |
| 1,165,133 | 12/1915 | Schauman | 217/23 |
| 1,176,427 | 3/1916 | Bussey | 217/27 |
| 1,232,226 | 7/1917 | Copony | 217/26 |
| 1,257,252 | 2/1918 | Kronenberger | 217/26.5 |
| 1,875,188 | 8/1932 | Williams | 428/178 |
| 2,481,046 | 9/1949 | Scurlock | 189/34 |
| 2,662,659 | 12/1953 | Putnam | 217/26.5 |
| 2,813,652 | 11/1957 | Parsons | 217/26.5 |
| 2,950,726 | 8/1960 | Kuhl et al. | 134/194 |
| 3,011,602 | 12/1961 | Ensrud et al. | 428/213 |
| 3,112,533 | 12/1963 | Hauer | 20/15 |
| 3,262,786 | 7/1966 | Weiss | 99/171 |
| 3,695,479 | 10/1972 | Crabtree | 217/26.5 |
| 3,869,778 | 3/1975 | Yancey | 52/635 |
| 3,911,187 | 10/1975 | Raley | 428/180 |
| 4,169,339 | 10/1979 | See | 428/174 |

FOREIGN PATENT DOCUMENTS

| 723991 | 12/1965 | Canada . |
|---|---|---|
| 426028 | 6/1911 | France . |
| 857000 | 8/1940 | France . |
| 856441 | 12/1960 | United Kingdom . |
| 1010374 | 11/1965 | United Kingdom . |

Primary Examiner—Paul J. Thibodeau
Attorney, Agent, or Firm—Stevens, Davis, Miller & Mosher

[57] ABSTRACT

A construction element of folded sheet material having a repetitive pattern of similarly shaped geometric figures. The tops of the figures lie in one plane and the troughs in a second parallel plane. Four tops are situated around one trough and are connected with it through four angled surfaces.

7 Claims, 5 Drawing Figures

CONSTRUCTION-ELEMENT

The invention relates to a construction-element comprising sheetlike material, which according to a regular repetitive pattern is folded such that the tops are lying in one plane and the troughs in an other plane which extends parallel to the first plane and spaced apart from it.

Construction-elements of this type are known in many forms. An example is formed by an undulated plate with a trapeziform cross-section of the undulations.

Purposes of the invention is the provision of a construction-element with larger or other possibilities of application and which in certain applications, for instance as filling element in a panel, can provide greater strength.

According to the invention the sheetlike material is folded in two directions extending perpendicular to each other, such that each trough as well as each top is formed by a flat rectangular surface lying in one or the other respectively of the said parallel extending planes and the connection of each top with the surrounding troughs and of each trough with the surrounding tops respectively is formed by a geometric figure such as a rectangle, the plane of which extends at an angle with the parallel planes. Preferably each trough and each top has the form of a flat square surface.

Such a construction-element has tops and troughs in the form of flat surfaces and always four tops are situated around one trough and connected with it through four rectangular surfaces extending at an angle towards the trough. Such a construction-element may be used as packaging material since each trough between a number of tops forms a hollow space in which an object can be placed whilst below each top a similar but inverted space is present which can be placed over an object.

Such a construction-element can be made from a plano, by making use of folding lines and cutting lines, but also can be manufactured by deep-drawing, for instance by means of vacuum, out of a plate from thermoplastic synthetic resin.

It is possible as well to press such a construction element from synthetic resin, steelplate, tin plate. It even is possible to manufacture such an element from concrete.

According to the manner of manufacturing the space between the squares forming the tops and troughs and located between the corners of said tops and troughs may be performed in different manners. Said spaces can be closed, be entirely open or have parts which in pairs extend perpendicular to each other and perpendicular to the common plane of tops and troughs respectively and having the form of triangles, the basis of which corresponds in length with the long sides of the inclined rectangles.

The closed as well as the open structure may be used as packaging material, the open structure showing flexibility in the plane of the element and accordingly can adapt itself to different dimensions of the objects to be packed.

The construction-element in which said spaces are bordered by the parts extending perpendicular to the planes through the tops and troughs surround rectangular openings and such a construction-element is in particular suitable to be applied as filling element for a panel because it provides large contact-surfaces for the connection to the plates of the panel whereas the triangular portions which extend perpendicular to the planes of said plates from ribs which give the structure a high degree rigidity.

Apart from manufacturing by deformation of a thermoplastic synthetic resin, the construction-element may be manufactured in a simple way out of a plano which in two perpendicular directions is provided with pairs of folding lines which form rectangles there where they intersect such that always four rectangles enclose in the centre a fifth rectangle and always said four rectangles surrounding the fifth rectangle are punched out of the plano. One then obtains a construction-element which between the corners of the tops and troughs show rectangular openings in planview.

However, it is also possible in applying a plano to provide said plano in two perpendicular directions with pairs of folding lines which there where intersect form squares such that always four squares enclose in the centre a fifth square which four squares each are provided with a cutting line extending according to a diagonal of each square, which diagonals extend such that they are perpendicular to the cutting line of each adjacent square, the other diagonal being a folding line, which plano after cutting of the cutting lines is folded such that the triangular planes of the squares disconnected by the cutting are folded to extend perpendicular to the fifth squares. In this way a construction-element is obtained which is in particular suitable as a filling element for a panel. By a panel is meant each plate-like element which can be used in the manufacturing of walls, doors etc., or other construction-elements for buildings and the like, but also can be used for the manufacturing of pallets for the transportation of goods or for other packaging purposes.

Non flat elements can be applied in aeroplane bodies, ship hulls or large storage tanks, an entirely different application is in heat exchangers, comprise a number of tubes with radially extending plate-like ribs, or a number of plates having a plurality of openings through which the tubes extend.

The construction-element according to the invention is suitable for this purpose as well, and in particular that construction-element which also is suitable as filling for a panel or the like, since the rectangular openings form an excellent connection and joint upon tubes having a rectangular cross-section. The construction-elements apart from own rigidity to have the advantage of a large surface with respect to their volume.

It is possible to think of a heat exchanger through the tubes of which a fluid flows whereas an other fluid flows around the construction-element which may function as cooling ribs or as means for heating the fluid in the tubes. A liquid may be used as well forflowing around the tubes.

It further is possible to place the construction-elements with the tops and troughs against each other, but also with the tops and troughs in line so that nesting of the elements in each other is possible more or less.

According to the invention the manufacturing is possible as well such that a plano is provided with folding lines according to a pattern of rows of regularly spaced squares with in between smaller squares, which from one row to the other are staggered such that in two directions in the plane of the plano the smaller squares lie between the larger and are connected with said larger squares by trapezoidal surfaces to which the oblique sides form cutting lines and the straight sides between the cutting lines are punched out. One then obtains elements with facet like openings.

The invention will now be further elucidated with reference to the drawings.

DESCRIPTION OF THE PREFERRED EMBODIMENTS

Figure 1:
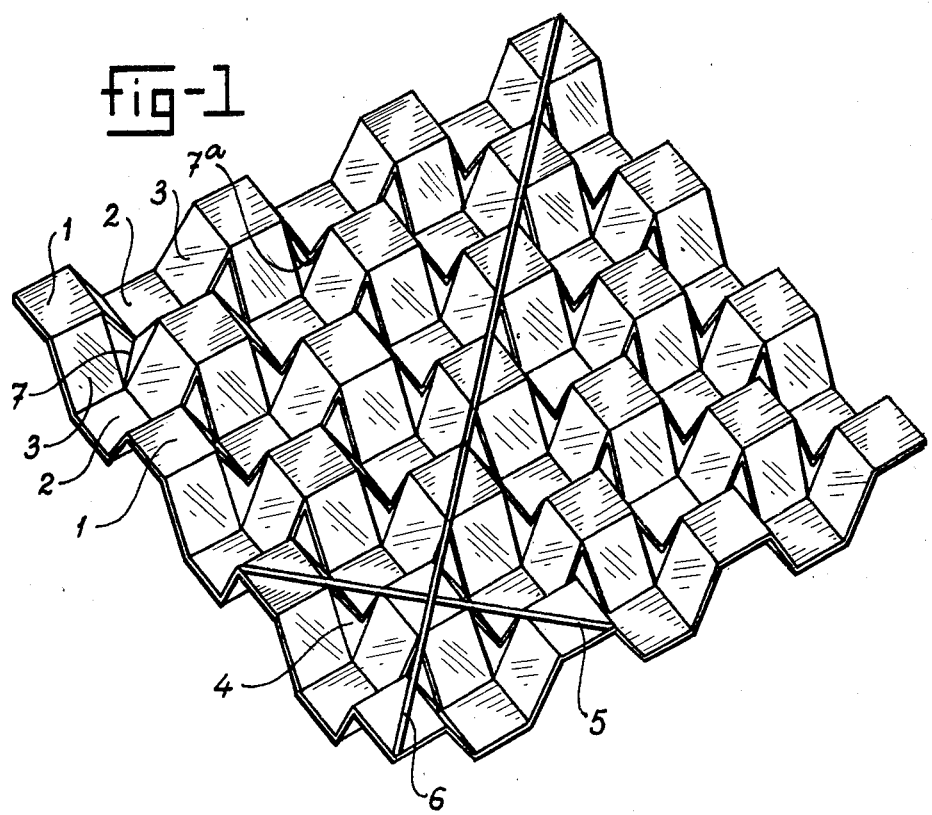
FIG. 1 shows in perspective a construction-element according to the invention.

The element shown in FIG. 1 comprises in principle flat square tops 1 and troughs 2, which in two perpendicular directions are interconnected by inclined rectangular surfaces 3.

Between the opposite corners of the tops 1, troughs 2 and the opposite long rectangular sides of the surfaces 3 there are openings 4 which in planview are square as well. Said openings 4 allow the flexibility of the element. If said flexibility is not desired, the tops and troughs can be fixed with respect to each other by connecting-strips 5 and 6 of which only two are shown. If at the location of the openings 4 a closed structure is desired, then this is possible, as indicated at one spot with reference 7, when the construction-element is made from thermoplastic resin, sheet metal or concrete.

If the construction element is formed from a plate of synthetic resin or metal by making use of a die, which does not support the plate there where the openings are according to FIG. 1, than at said places a hyperbolic interconnecting surface a formed between the adjacent rectangular transitional surfaces as indicated at 7a. This improves the stiffness of the element.

The element shown in FIG. 1 shows between four rectangular surfaces 3 a hollow space. Said space can be used for packaging purposes.

Figure 2:
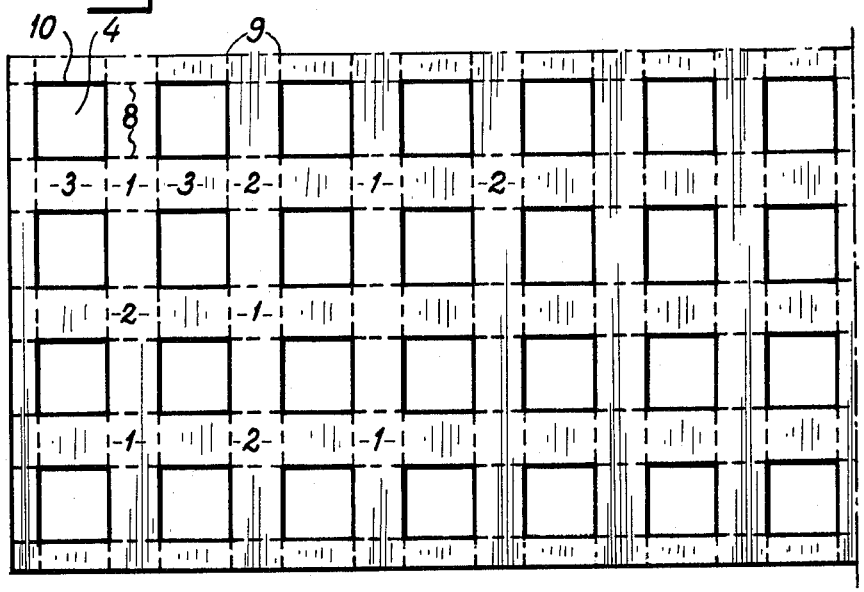
FIG. 2 shows a plano from which the construction-element of FIG. 1 can be manufactured.

FIG. 2 shows a plano with pairs of folding lines 8 and 9 respectively, extending perpendicular to each other and forming square surfaces 1 and 2 which will form the tops and troughs as well as rectangular surfaces 3 interconnecting said tops and troughs. With 10 the cutting line of a square is indicated forming each opening 4. By punching out the openings 4 according to the cutting lines 10 and by making the folding lines 8 and 9 a plano is formed which easily can be folded in the shape shown in FIG. 1.

Figure 3:
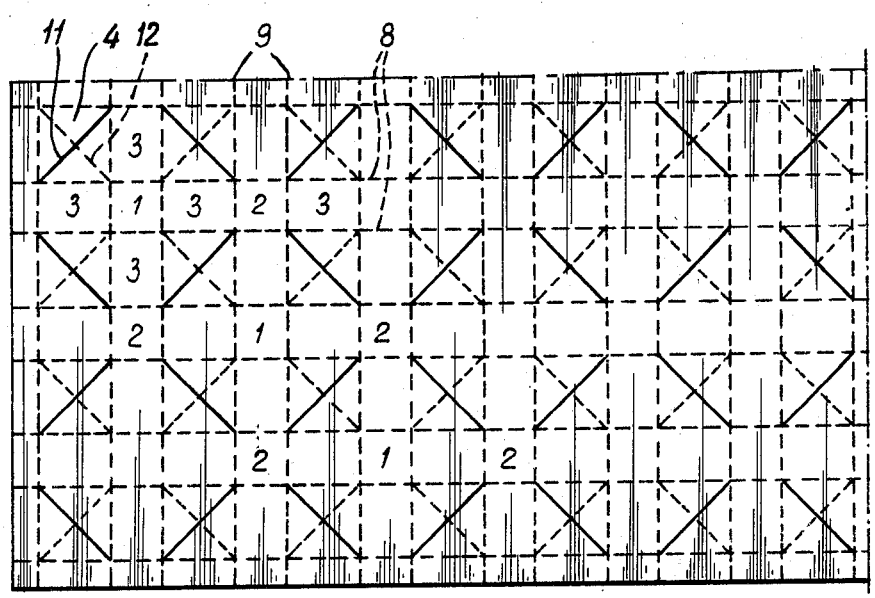
FIG. 3 shows an other plano for the manufacturing of a construction-element according to the invention.

FIG. 3 shows the same plano as FIG. 2 in which for the same square and rectangular surfaces the same references are used. The cutting lines 10 are left out and instead at the location of the openings 4 a cutting line 11 and a folding line 12 are provided, which extend according to the two diagonals of the aquare 4. Such a plano, after folding and cutting, can take the shape shown in FIG. 4, in which the square openings 4 are bordered by triangular side-surfaces 13, 14 extending perpendicular to each other and perpendicular to the planes through the tops 1 and troughs 2 respectively.

Figure 4:
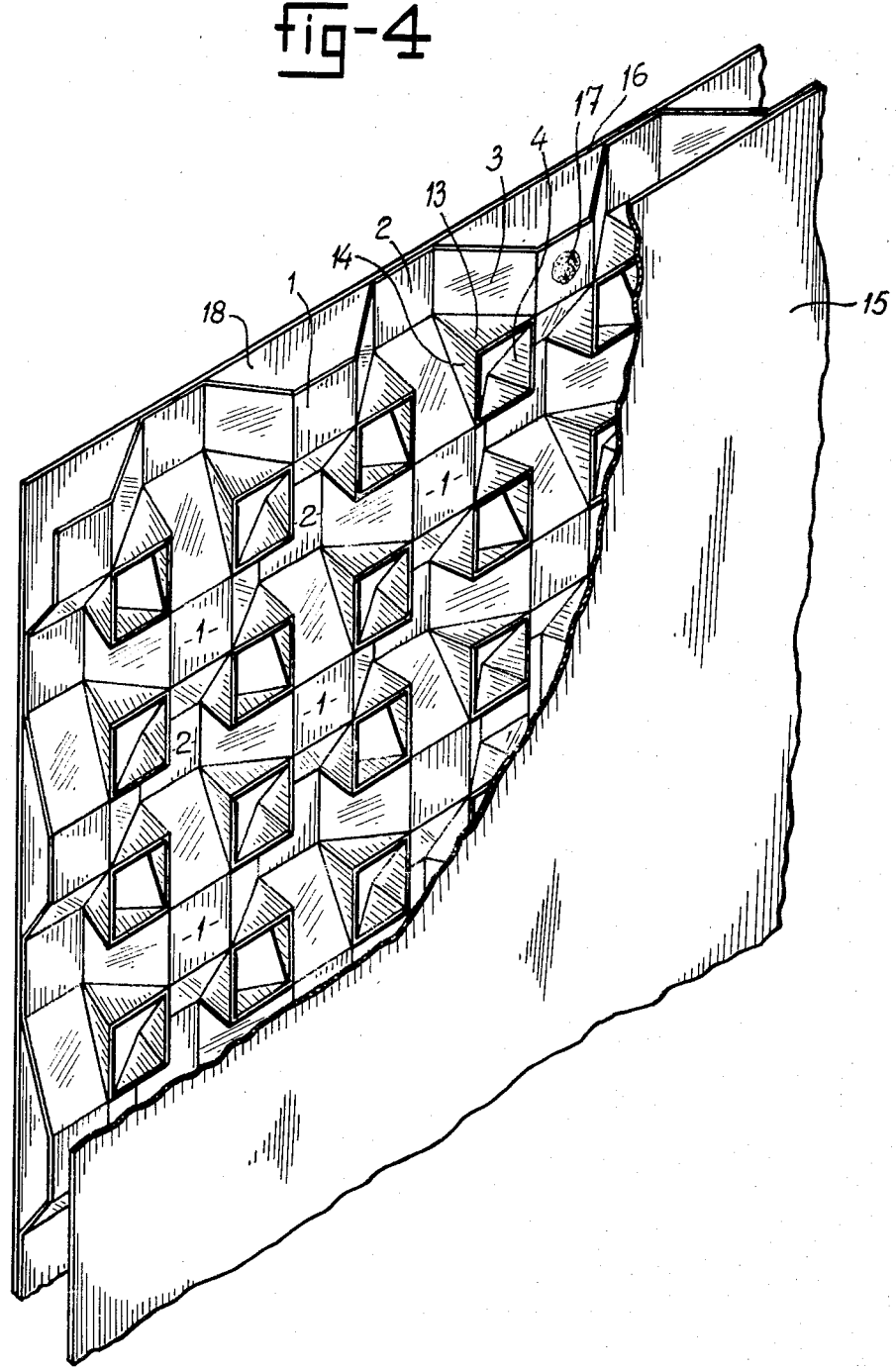
FIG. 4 shows the application of the construction-element manufactured with the plano of FIG. 3 in a panel.

If such an element, as shown in FIG. 4, is placed between flat plates 15, 16 and adhered to said plates 15, 16, for instance by adhesvive, or spot welding as indicated at 17, a strong panel is formed deriving its strength from the large contact surfaces which may be formed by the entire surface of the tops and troughs respectively and by the surfaces 13 and 14 which function as stiffening ribs.

Contrary to honey-comb-panels a structure is formed which apart from a larger contact surface of the construction-element which serves as filling, also offers a better sound-isolation because the inclined surfaces 3 function as reflexion-surfaces.

In looking at FIG. 4 one can imagine that the square openings 4 make a good connection possible with square tubes extending through said openings. The construction-element according to said application is extremely suitable as heat exchanger since the construction-element combines a large surface with its own rigidity.

The heat exchanger can be manufactured from the elements shown in FIG. 4 (without the plates 15 and 16) by placing said elements such that the tops, troughs and inclined rectangles are at equal distances from each other and with square cubes extending through all square openings. The triangular surfaces 13 and 14 then are connected with the square cubes by means of adhesive, solder or by welding. In this way undulating chanels are formed between the elements through which a fluid can flow in heat exchanging contact with an other fluid in the tubes.

One further can image that construction-elements, as shown in FIG. 1 as well as the ones shown in FIG. 4 (without the plates 15 and 16) can be shaped such that they fit in each other. The element shown in FIG. 1 has said property without anymore, if the strips 5 and 6 are absent. As packaging element a large stack of said elements can be placed in a small space, if not used for packaging purposes. They then are readily avilable.

If the elements according to FIG. 4 are made by pressing out of metal or by deep-drawing of metal or synthetic resin then it is possible to shape said elements such that the surfaces 13 and 14 take a position which differs a little bit from the perpendicular position and accordingly are conical, which improves nesting. Within the scope of the invention a number of deviations are possible.

In FIG. 1 the squares of the tops 1 and troughs 2 have the same dimensions. This is not necessary. When the tops are made smaller than the troughs or reverse, the inclined transitional surfaces 3 obtain the form of a trapezoid. The cut out squares in FIG. 2 then are cut out facets, the smallest angles of which being directed towards the tops and troughs respectively with the smallest dimensions.

The tops and troughs in the embodiment of FIG. 2 need not to be square.

If the horizontal distances between the cut out squares 4 is much smaller than the vertical distances, the tops and troughs obtain a rectangular shape while the adjacent transitional surfaces become smaller as well.

It even is possible to reduce or broaden the strips between the cut out squares at random without changing the properties of the element in principle.

The only condition is that the cut out portions have equal sides with the limits that the square shape or a facet shape can transfer into a straight line (a facet in which the short diagonal is zero).

Figure 5:
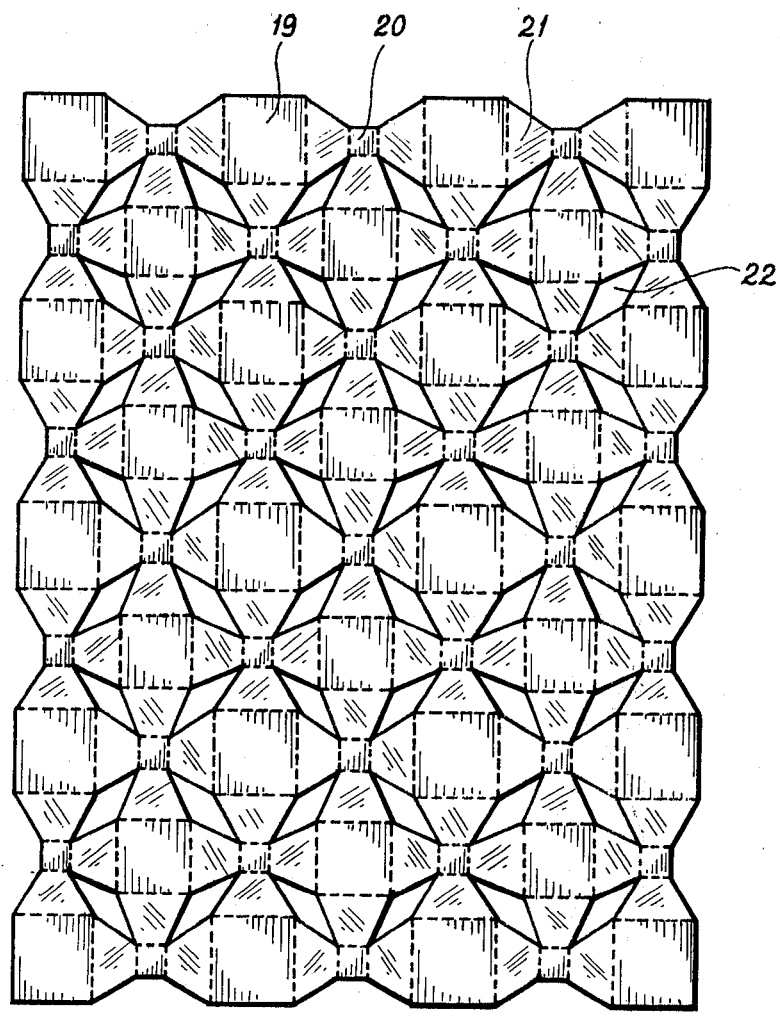
FIG. 5 shows a plano for the manufacturing of an other element according to the invention.

FIG. 5 shows a variant referred to already before.

Said embodiment shows large squares 19 and small ones 20, interconnected by trapezoids 21. The facet shaped places between said squares 19 and 20 can be punched out.

I claim:

1. A construction element comprising a plate like material folded to a regular repetitive pattern to form a plurality of regularly spaced depressions defined by rectangular tops located in a first plane and rectangular troughs located in a second plane said tops and troughs surrounding one another and being interconnected by four inclined flat surfaces, each said inclined flat surface being connected at opposite parallel ends to an edge of a respective top and an edge of a respective trough and having opposite side edges which are unconnected such that the unconnected side edges of said inclined flat surfaces define voids located between said tops and troughs which define rectangular openings in said construction element in a direction normal to said first and second planes.

2. A construction element comprising a plate like material folded to a regular repetitive pattern to form a plurality of regularly spaced depressions defined by rectangular tops located in a first plane and rectangular troughs located in a second plane said tops and troughs surrounding one another and being interconnected by inclined flat surfaces, each said inclined flat surface being connected at opposite parallel ends to an edge of a respective top and an edge of a respective trough and having opposite side edges, said side edges of said inclined surfaces being connected along their length to respective triangular flat surfaces which are perpendicular to the inclined surfaces to which they are connected and perpendiular to said first and second planes, a pair said triangular flat surfaces being edge connected and defining, with another pair of edge connected triangular flat surfaces, an opening in said construction element in a direction normal to said first and second planes.

3. A construction-element according to claims 1 or 2, wherein said troughs and tops respectively have an opening at their corners.

4. A contruction-element according to claims 1 or 2, wherein the tops and troughs are square surfaces.

5. A construction-element according to claims 1 or 2, wherein the tops have a smaller area than the troughs and the inclined flat surfaces between the tops and troughs are in the form of a trapezoid.

6. A construction element according to claims 1 or 2, further comprising two flat plates respectively connected to the tops and troughs.

7. A construction element according to claim 6, wherein said plates are curved.

* * * * *